US012517044B2

(12) United States Patent
Maestle et al.

(10) Patent No.: US 12,517,044 B2
(45) Date of Patent: Jan. 6, 2026

(54) METHOD AND DEVICE FOR PROCESSING DATA ASSOCIATED WITH A MODEL (71) Applicant: Helmut Fischer GmbH Institut fuer Elektronik und Messtechnik, Sindelfingen (DE)

(72) Inventors: Ruediger Maestle, Boeblingen (DE); Lars-Christian Anklamm, Berlin (DE)

(73) Assignee: Helmut Fischer GmbH Institut fuer Elektronik und Messtechnik, Sindelfingen (DE)

(*) Notice: Subject to any disclaimer, the term of this patent is extended or adjusted under 35 U.S.C. 154(b) by 120 days.

(21) Appl. No.: 18/021,158

(22) PCT Filed: Aug. 10, 2021

(86) PCT No.: PCT/EP2021/072290
§ 371 (c)(1),
(2) Date: Feb. 13, 2023

(87) PCT Pub. No.: WO2022/034093
PCT Pub. Date: Feb. 17, 2022

(65) Prior Publication Data
US 2023/0314316 A1 Oct. 5, 2023

(30) Foreign Application Priority Data
Aug. 14, 2020 (DE) .......................... 102020121478.2

(51) Int. Cl.
*G01N 21/3581* (2014.01)
(52) U.S. Cl.
CPC ................ *G01N 21/3581* (2013.01)

(58) Field of Classification Search
None
See application file for complete search history.

(56) References Cited

U.S. PATENT DOCUMENTS

| 5,623,145 | A | * | 4/1997 | Nuss | G01N 21/3586 250/341.1 |
| 9,400,214 | B1 | * | 7/2016 | Demers | G01J 3/10 |
| 10,071,482 | B2 | * | 9/2018 | Nichols | B25J 9/1679 |
| 10,795,151 | B2 | * | 10/2020 | Wang | G01N 21/3586 |
| 12,105,021 | B2 | * | 10/2024 | Klose | G01N 21/952 |
| 12,146,733 | B2 | * | 11/2024 | Mästle | G01S 7/4004 |
| 2007/0235658 | A1 | * | 10/2007 | Zimdars | G01N 21/3586 250/390.07 |

(Continued)

FOREIGN PATENT DOCUMENTS

DE 102011104708 A1 12/2012
JP 2007071585 A 3/2007

(Continued)

*Primary Examiner* — David P Porta
*Assistant Examiner* — Djura Malevic
(74) *Attorney, Agent, or Firm* — KRIEGSMAN & KRIEGSMAN (57) ABSTRACT

Method for processing data associated with a model, wherein the model characterises a propagation of THz radiation, for example in the region of at least one terahertz device and/or at least one object that can be examined by means of the terahertz radiation, for example, wherein the method includes: analysing the model, wherein an analysis result is obtained, at least partially and/or intermittently saving the analysis result.

18 Claims, 5 Drawing Sheets

(56) References Cited

U.S. PATENT DOCUMENTS

| | | | | |
|---|---|---|---|---|
| 2008/0006767 A1* | 1/2008 | Taday | ............... | G01N 21/3586 |
| | | | | 250/252.1 |
| 2009/0057559 A1* | 3/2009 | Koyama | ................. | G01J 3/02 |
| | | | | 250/340 |
| 2011/0079720 A1* | 4/2011 | Heidari | .................... | G01J 3/42 |
| | | | | 250/340 |
| 2011/0298652 A1* | 12/2011 | Yanagihara | ........... | G01S 13/874 |
| | | | | 342/146 |
| 2013/0204577 A1* | 8/2013 | Savard | ............... | G01B 11/0691 |
| | | | | 702/172 |
| 2017/0050208 A1* | 2/2017 | Nichols | ................. | B25J 9/1679 |
| 2018/0038681 A1 | 2/2018 | Van Mechelen | | |
| 2019/0317315 A1* | 10/2019 | Wang | ................. | G01B 11/2518 |
| 2019/0331594 A1* | 10/2019 | Klose | ................... | G01N 21/952 |
| 2020/0182783 A1* | 6/2020 | Jun | ..................... | G01N 21/9501 |
| 2021/0201140 A1* | 7/2021 | Watanabe | ................ | G06N 3/08 |
| 2022/0178677 A1* | 6/2022 | Böhm | .................... | G01B 11/06 |
| 2023/0093966 A1* | 3/2023 | Klose | ................. | G01N 21/3581 |
| | | | | 250/341.8 |
| 2023/0175960 A1* | 6/2023 | Maestle | ................. | G01B 11/24 |
| | | | | 250/340 |
| 2023/0314316 A1* | 10/2023 | Maestle | ............ | G01N 21/3581 |
| | | | | 250/341.1 |

FOREIGN PATENT DOCUMENTS

| | | | |
|---|---|---|---|
| JP | 2007071611 A | 3/2007 |
| JP | 2008500541 A | 1/2008 |
| JP | 2013228328 A | 11/2013 |
| WO | 2020008654 A1 | 1/2020 |

* cited by examiner

METHOD AND DEVICE FOR PROCESSING DATA ASSOCIATED WITH A MODEL

Exemplary embodiments relate to a method for processing data associated with a model, wherein the model characterises a propagation of THz radiation, for example in the region of at least one terahertz device and/or at least one object that can be examined by means of the terahertz radiation, for example, wherein the method includes: analysing the model, wherein an analysis result is obtained, at least partially and/or intermittently saving the analysis result.

In further exemplary embodiments, the analysis result can be used, for example, in the temporal context of ascertaining the analysis result, for example directly after ascertaining the analysis result, for example in order to further process measured data obtained by means of measurements, e.g. measurements based on THz radiation and/or to evaluate it or similar.

In further exemplary embodiments, the analysis result can also be used, for example, without a concrete or even any temporal context of ascertaining the analysis result, for example in order to further process measured data obtained by means of measurements, e.g. measurements based on the THz radiation, at a later point in time and/or to evaluate it or similar. In further exemplary embodiments, the use of the analysis result can be carried out e.g. more than one day later than ascertaining the analysis result, by way of further example more than one week later, by way of further example more than one month later, by way of further example more than one year later.

In further exemplary embodiments, the analysis result can also be used, for example, without a spatial context of ascertaining the analysis result. For example, in further exemplary embodiments, a first device can ascertain the analysis result at a first point in time and/or at a first location, and a second device, which is different to the first device, can use the analysis result at a second point in time and/or at a second location.

In further exemplary embodiments, it is provided that the analysis result is saved in a non-volatile manner, for example in a database and/or a non-volatile memory, e.g. also a computer-readable non-volatile memory.

In further exemplary embodiments, it is provided that the method further includes: providing at least one part of the analysis result.

In further exemplary embodiments, it is provided that the provision includes at least one of the following elements: a) sending data characterising the analysis result via a local, for example wire-bound and/or wireless, data interface, b) sending data characterising the analysis result via a data network, for example an at least regionally public data network (e.g. internal or private data network (for example also a virtual private network, VPN), wherein the data network has, for example, at least one wire-bound and/or wireless data connection, c) providing data characterising the analysis result via a cloud system and/or an edge-computing system (e.g. in the region of a manufacturing device), d) providing data characterising the analysis result by means of at least one e.g. computer-readable data medium.

In further exemplary embodiments, it is provided that the method further includes: carrying out at least one first measurement in relation to the object by means of the terahertz radiation, wherein a first measuring result is obtained, ascertaining at least one property of the object based on the first measuring result and on at least one part of the analysis result.

In further exemplary embodiments, the first measurement can be based, for example, on a transmission of the THz radiation through at least parts of the object and/or on a reflection of the THz radiation on the object.

In further exemplary embodiments, the first measurement can be carried out e.g. according to the principle of the time domain spectroscopy.

In further exemplary embodiments, the first measurement can be carried out e.g. according to the principle of frequency domain spectroscopy.

In further exemplary embodiments, it is provided that the method further includes: carrying out at least one second measurement relating to the object by means of at least one further measuring method, which is not caused by the terahertz radiation, wherein a second measuring result is obtained, and, optionally, ascertaining the at least one property of the object based on the first measuring result and on the second measuring result and based on at least one part of the analysis result.

In further exemplary embodiments, it is provided that the second measurement includes at least one of the following elements: a) ascertaining a spacing between the object (e.g. a surface of the object) and at least one component of the terahertz device, e.g. a THz transmitter and/or THz receiver of the terahertz device, b) ascertaining at least one parameter that characterises an angle between a beam path of the terahertz device and a surface normal of a or the surface of the object, c) ascertaining surface properties and/or shape properties, for example a curvature (in at least one dimension), of a or the surface of the object, d) ascertaining at least one further property of the object, for example a temperature and/or an aggregate state and/or an e.g. electric conductivity.

In further exemplary embodiments, at least some of the embodiments mentioned above by way of example for the second measurement can be carried out without contact or contacting the object at least intermittently.

In further exemplary embodiments, it is provided that the method further includes: predetermining at least one parameter range, which characterises a value range of at least one parameter relating to at least one property of the object, analysing the model for the at least one parameter range, and, optionally, at least temporarily saving an analysis result ascertained based on the analysis of the model for the at least one parameter range.

In further exemplary embodiments, a parameter range of interest e.g. for measurements following later can be set by predetermining the at least one parameter range, or the analysis result can be limited to the range of interest.

In further exemplary embodiments, it is provided that the predetermination is carried out based on at least one of the following elements: a) at least one tolerance limit relating to the object, for example one or more production tolerances of the object and/or production tolerances of components, for example lacquer layers, of the object, b) parameters characterising a process of a measurement relating to the object, for example an exactness of a positioning of the terahertz device in relation to the object for a measurement to be carried out by means of THz radiation, c) parameters characterising the terahertz device, for example a parameter characterising the frequency range of the terahertz radiation, d) at least one parameter characterising a use of the analysis result.

In further exemplary embodiments, it is provided that the object has a layer construction made of one or more layers, e.g. lacquer layers, wherein for example at least one layer has a polymer material, wherein the object optionally has at least one layer, for example a substrate, made of a metallic material.

In further exemplary embodiments, the object can also be formed in such a way that the THz radiation is transmitted at least regionally, i.e. is radiated at least partially through the object.

In further exemplary embodiments, it is provided that the model characterises properties of the object, wherein the properties of the object include at least one of the following elements: a) a parameter characterising a layer thickness of at least one layer, e.g. the layer thickness itself, b) refraction index, for example refraction index depending on the frequency, of at least one layer, c) absorption index, for example absorption index depending on frequency, of at least one layer, d) aggregate state of at least one layer, e) properties of a substrate.

In further exemplary embodiments, it is provided that the model characterises properties of the at least one terahertz device and/or at least one component of the terahertz device, wherein the properties of the terahertz device include at least one of the following elements: a) propagation properties of the terahertz radiation, for example in the region of the terahertz device and/or in the region of the object, for example characterizable by amplitude and/or phase properties.

In further exemplary embodiments, the propagation properties of the terahertz radiation can be characterised, for example, in a spectral range, and/or spatially.

In further exemplary embodiments, it is provided that the model characterises properties of a surroundings of the at least one terahertz device and/or the object, wherein the properties of the surroundings of the at least one terahertz device and/or the object include at least one of the following elements: a) refraction index, for example refraction index depending on frequency, of at least one medium in the region of the surroundings, b) absorption index, for example absorption index depending on frequency, c) aggregate state, d) temperature, e) pressure.

In further exemplary embodiments, it is provided that the model includes at least one of the following elements: a) a reflection model or transmission model which characterises reflections or transmissions of the THz radiation in the object, for example, b) a propagation model which characterises the propagation of the THz radiation, for example through the THz device and/or the surroundings.

In further exemplary embodiments, it is provided that the model is ascertained or formed based on measurements and/or simulations.

Further exemplary embodiments relate to a method for processing at least one measuring result relating to an object, wherein the method includes: carrying out at least one first measuring relating to the object by means of terahertz radiation, wherein a first measuring result is obtained, ascertaining at least one property of the object based on the first measuring result and on at least one analysis result or at least one part of an analysis result, which is obtained when analysing a model, wherein the model characterises a propagation of the THz radiation, for example in the region of at least one terahertz device and/or the object.

In further exemplary embodiments, it is provided that the analysis result has been ascertained according to the embodiments described above by way of example.

In further exemplary embodiments, it is provided that the method further includes: receiving the analysis result, e.g. from a device which has ascertained the analysis result, e.g. according to the embodiments described above by way of example, and/or which saves the analysis result at least intermittently.

In further exemplary embodiments, it is provided that the analysis result is ascertained or has been ascertained before carrying out the first measurement.

In further exemplary embodiments, it is provided that the method further includes: carrying out at least one second measuring relating to the object by means of at least one further measuring method, which is not caused by the terahertz radiation, for example, wherein a second measuring result is obtained, and, optionally, ascertaining the at least one property of the object based on the first measuring result and on the second measuring result and based on at least one part of the analysis result.

In further exemplary embodiments, it is provided that receiving the analysis result includes at least one of the following elements: a) receiving data characterising the analysis result via a local, for example wire-bound and/or wireless, data interface, b) receiving data characterising the analysis result via a data network, for example an at least regionally public data network (e.g. internet) or private data network (or e.g. also VPN), wherein the data network has, for example, at least one wire-bound and/or wireless data connection, c) retrieving data characterising the analysis result from a cloud system and/or edge-computing system, d) loading data characterising the analysis result by at least one data medium.

In further exemplary embodiments, it is provided that the THz radiation has a frequency range of between 0.1 THz and 30 THz, for example between 3 THz and 10 THz, by way of further example between 4.5 THz and 6.5 THz.

In further exemplary embodiments, it is provided that the THz radiation has a frequency range of between 0.1 THz and 8 THz. In further exemplary embodiments, it is provided that the THz radiation has a frequency range of between 0.01 THz and 4.0 THz.

In further exemplary embodiments, it is provided that the method is a computer-implemented method. In further exemplary embodiments, this appliesto the method described above.

Further exemplary embodiments relate to a device for carrying out the method according to the embodiments.

Further exemplary embodiments relate to a computer-readable storage medium, comprising commands which, when carried out by a computer, allow it to carry out the method according to the embodiments.

Further exemplary embodiments relate to a computer program, comprising commands which, when carried out by a computer, allow it to carry out the method according to the embodiments.

Further exemplary embodiments relate to a data medium signal which transfers and/or characterises the computer program according to the embodiments.

Further exemplary embodiments relate to a use of the method according to the embodiments and/or the device according to the embodiments and/or the computer-readable storage medium according to the embodiments and/or the computer program according to the embodiments and/or the data medium signal according to the embodiments for at least one of the following elements: a) ascertaining properties of the object, b) predicting the analysis result, for example before carrying out a or the first and/or second measuring, c) training a, for example artificial, neuronal network, for example of a deep artificial neuronal network.

Further features, usage possibilities and advantages of the invention emerge from the description below of exemplary embodiments of the invention, which are depicted in the figures of the drawings. Here, all features described or depicted form the object of the invention inherently or in any combination, regardless of their summary in the claims or their back-reference and regardless of their formulation or depiction in the description or in the drawings.

Figure 1:
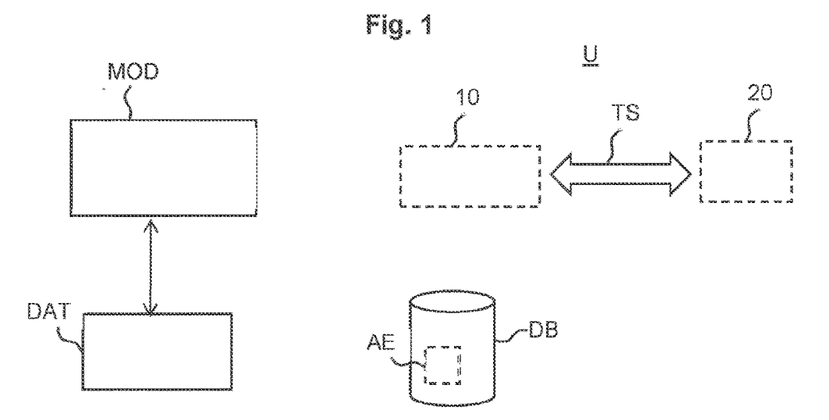
FIG. 1, schematically, a simplified block diagram according to exemplary embodiments, FIG. 2, schematically, a simplified flowchart according to further exemplary embodiments, FIG. 3, schematically, a simplified flowchart according to further exemplary embodiments, FIG. 4, schematically, a simplified block diagram according to further exemplary embodiments, FIG. 5A, 5B, schematically in each case, a simplified flowchart according to further exemplary embodiments, FIG. 6, schematically, a simplified flowchart according to further exemplary embodiments, FIG. 7, schematically, a simplified flowchart according to further exemplary embodiments, FIG. 8, schematically, a simplified side view of an object according to further exemplary embodiments, FIG. 9A, 9B, schematically, in each case, a simplified flowchart according to further exemplary embodiments, FIG. 10, schematically, a simplified block diagram of a model according to further exemplary embodiments, FIG. 11A, schematically, a simplified flowchart of a method according to further exemplary embodiments, FIG. 11B, schematically, a simplified flowchart of a method according to further exemplary embodiments, FIG. 11C, schematically, a simplified flowchart of a method according to further exemplary embodiments, FIG. 12, schematically, a simplified flowchart of a method according to further exemplary embodiments, FIG. 13, schematically, a simplified block diagram of a device according to further exemplary embodiments, FIG. 14, schematically, a simplified block diagram of a device according to further exemplary embodiments, FIG. 15, schematically, aspects of uses according to further exemplary embodiments, and FIG. 16, schematically, a neuronal network according to further exemplary embodiments.

FIG. 1 schematically shows a simplified block diagram according to exemplary embodiments. A model MOD is depicted which characterises a propagation of THz radiation TS, for example in the region, e.g. of a surroundings U, of at least one terahertz device 10 and/or at least one object 20 that can be examined, for example, by means of the terahertz radiation TS. In further exemplary embodiments, the propagation of the THz radiation TS, for example in the region U of the at least one terahertz device 10 and/or the at least one object 20, can be modelled or simulated by means of the model MOD.

In further exemplary embodiments, the THz device 10 is formed to send the THz radiation TS with at least one frequency component in a frequency range of between 0.1 THz and 30 THz, for example between 3 THz and 10 THz, by way of further example between 4.5 THz and 6.5 THz, e.g. to the object 20, and to receive amounts of the THz radiation TS reflected on the object 20, for example (and/or amounts transmitted through the object 20, not shown). In further exemplary embodiments, information about the object 20 can be ascertained based on the amounts reflected or transmitted, e.g. about layer thicknesses of one or more layers 21, 22, 23, e.g. lacquer layers, arranged on a surface of a substrate layer 24 (FIG. 8) of the object 20.

In further exemplary embodiments, it is provided that the THz radiation TS has a frequency range of between 0.1 THz and 8 THz. In further exemplary embodiments, it is provided that the THz radiation TS has a frequency range of between 0.01 THz and 4.0 THz.

Figure 2:
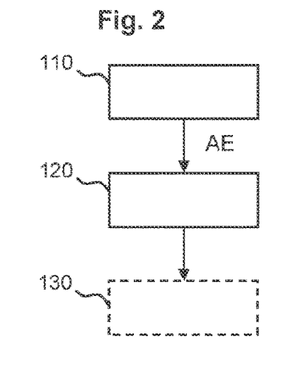

Further exemplary embodiments, c.f. FIG. 2, relate to a method for processing data DAT associated with a model MOD (e.g. parameters of the model MOD, starting variables for the model MOD), wherein the method includes: analysing 110 the model MOD, wherein an analysis result AE is obtained, at least intermittently and/or temporally saving 120 the analysis result AE.

In further exemplary embodiments, the analysis result AE characterises, for example, a propagation of the THz radiation from the THz device 10 to the object 20 and back again to the THz device 10, thus describes, for example, a THz receipt signal or an e.g. electric receipt signal characterising such a THz receipt signal, as can be ascertained by the THz device 10 upon receipt of the amounts of THz radiation TS reflected on the object 20.

In further exemplary embodiments, the analysis result AE can characterise, for example, at least one temporal course of the THz receipt signal or the electric receipt signal.

In further exemplary embodiments, the analysis result AE can characterise, for example, at least one spectral course of the THz receipt signal or the electrical receipt signal, i.e. can characterise a frequency spectrum of the THz receipt signal or the electrical receipt signal.

In further exemplary embodiments, the analysis result AE can be used, for example, in a temporal context of ascertaining 110 the analysis result, for example directly after ascertaining 110 the analysis result or after an optional step 130 of provision, for example in order to further process and/or to evaluate measured data obtained by means of measurement, e.g. measurements based on THz radiation TS, or similar.

In further exemplary embodiments, the analysis result AE can also be used, for example, without a concrete or even any temporal context of ascertaining 110 the analysis result AE, for example in order to further process measured data obtained by means of measurements, e.g. measurements based on the THz radiation TS (FIG. 1), at a later point in time and/or to evaluate it or similar. In further exemplary embodiments, the use of the analysis result AE can be carried out e.g. more than one day later than ascertaining 110 the analysis result AE, by way of further example more than one week later, by way of further example more than one month later, by way of further example more than one year later.

In further exemplary embodiments, the analysis result AE can also be used, for example, without a spatial context of ascertaining 110 (FIG. 2) the analysis result AE. For example, in further exemplary embodiments, a first device 300 (FIG. 13) can ascertain the analysis result AE at a first point in time and/or at a first location, and a second device 400 (FIG. 14), which is different to the first device 13, can use the analysis result AE at a second point in time and/or at a second location.

Figure 13:
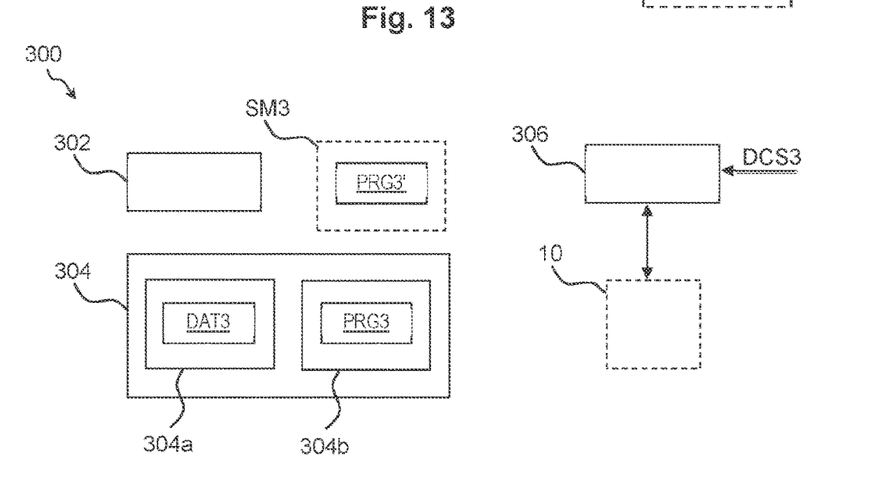
Figure 14:
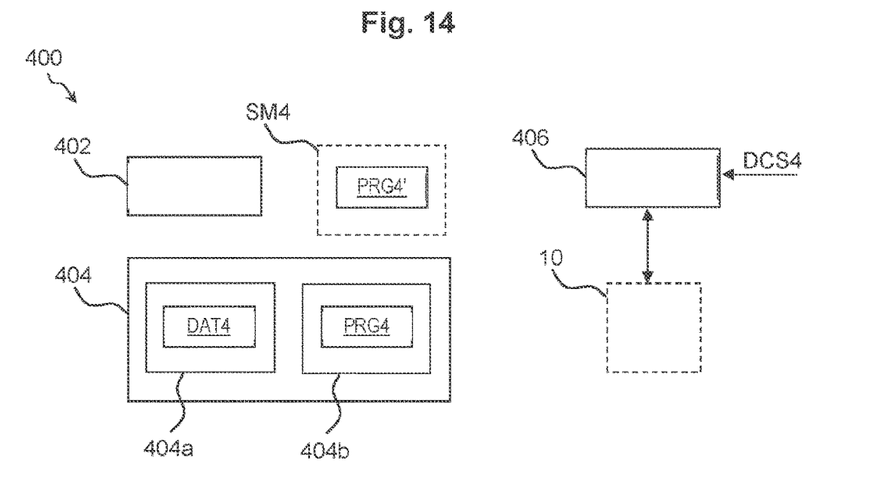

In further exemplary embodiments, the first device 300 and/or the second device 400 can be formed to ascertain and/or to use the analysis result AE.

In further exemplary embodiments, it is provided that the analysis result AE (FIG. 2) is saved in a non-volatile manner, for example in a database DB and/or a non-volatile memory, e.g. also a computer-readable non-volatile memory.

In further exemplary embodiments, c.f. FIG. 2, it is provided that the method further includes: providing 130 at least one part of the analysis result AE, e.g. for the use described above by way of example, e.g. by one or more users or one or more devices.

Figure 3:
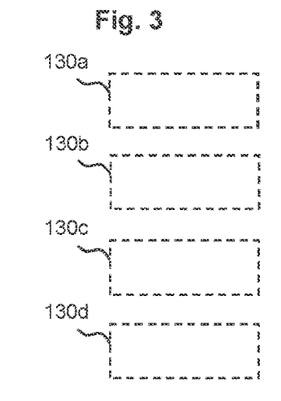

In further exemplary embodiments, c.f. FIG. 3, it is provided that the provision 130 (FIG. 2) includes at least one of the following elements: a) sending 130a data DAT-AE characterising the analysis result AE via a local, for example wire-bound and/or wireless, data interface DS1, DS1', c.f. also the exemplary block diagram from FIG. 4, b) sending 130b (FIG. 3) data DAT-AE characterising the analysis result via a data network DN (FIG. 4), for example an at least regionally public data network (e.g. internet) or private data network (for example also a virtual private network, VPN), wherein the data network has, for example, at least one wire-bound and/or wireless data connection, c) providing 130c (FIG. 3) data DAT-AE characterising the analysis result AE via a cloud system and/or an edge-computing system (not shown e.g. in the region of a manufacturing device), d) providing 130d data DAT-AE characterising the analysis result AE by means of at least one e.g. computer-readable data medium DT.

Figure 4:
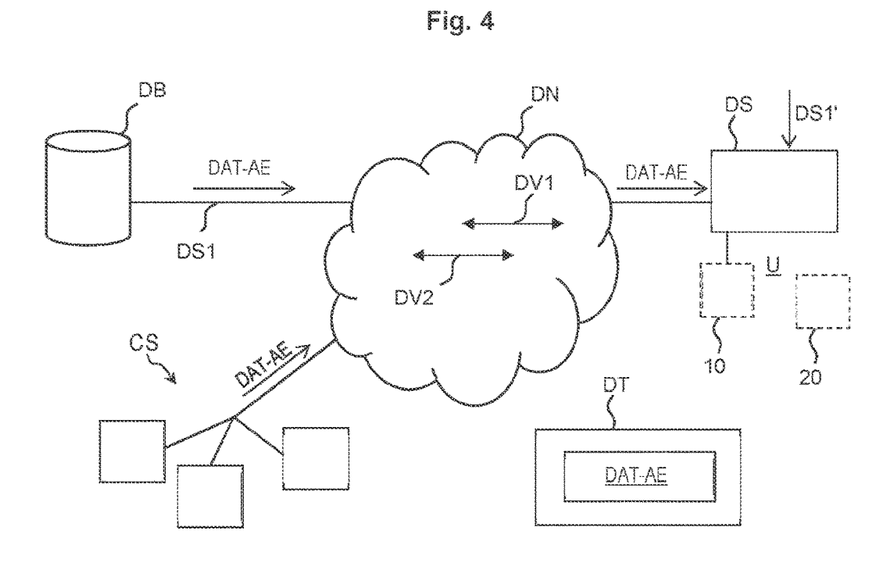

For example, a data sink DS can receive or load the data DAT-AE, e.g. via the data network DN or a different, e.g. direct, data connection DS1' e.g. to the database DB, e.g. for a use as has already been described above by way of example.

Figure 5A:
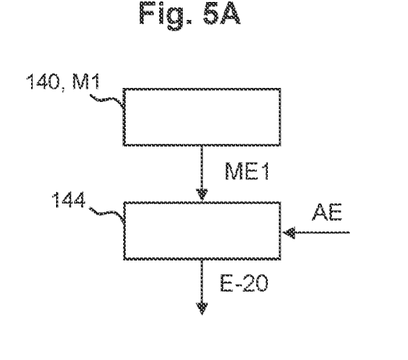

In further exemplary embodiments, c.f. FIG. 5A, it is provided that the method further includes: carrying out 140 at least one first measurement M1 in relation to the object 20 (FIG. 1) by means of the terahertz radiation TS, wherein a first measuring result ME1 is obtained, ascertaining 144 at least one property E-20 of the object 20 based on the first measuring result ME1 and on at least one part of the analysis result AE.

In further exemplary embodiments, the first measurement ME1 can be based, for example, on a transmission of the THz radiation TS through at least parts of the object 20 and/or on a reflection of the THz radiation TS on the object 20.

In further exemplary embodiments, the first measurement can be carried out e.g. according to the principle of the time domain spectroscopy.

In further exemplary embodiments, the first measurement can be carried out e.g. according to the principle of frequency domain spectroscopy.

In further exemplary embodiments, the first measuring result ME1 can characterise, for example, at least one temporal or spectral course of a THz receipt signal or an electrical receipt signal, as can be ascertained by the THz device 10 upon receipt of the amounts of the THz radiation TS reflected on the object 20.

In further exemplary embodiments, it can be ascertained e.g. by a comparison of the first measuring result ME1 with the analysis result AE as to whether e.g. the corresponding temporal or spectral courses—e.g. within predeterminable limits—agree with one another. Then, in further exemplary embodiments, it can be concluded, for example, that the model MOD, as underlies the analysis result AE, agrees comparably well with the real arrangement 10, 20, U.

In further exemplary embodiments, the analysis result AE can have e.g. a plurality of temporal or spectral courses for the receipt signal, for the formation of which (step 110 from FIG. 2) in each case at least one parameter or starting variable of the model MOD has been varied. In further exemplary embodiments, after carrying out the first measurement M1, a temporal or spectral course of the receipt signal obtained as the first measurement result ME1 can be compared to the plurality of temporal or spectral courses for the receipt signal according to the analysis result AE. In further exemplary embodiments, the temporal or spectral course of the receipt signal can be used by the analysis result AE, which best agrees with the first measuring result ME1 according to a predeterminable comparison criterion (e.g. correlation method or compensation method), in order to infer the at least one property E-20 e.g. of the object 20 from the parameters allocated to it.

Figure 5B:
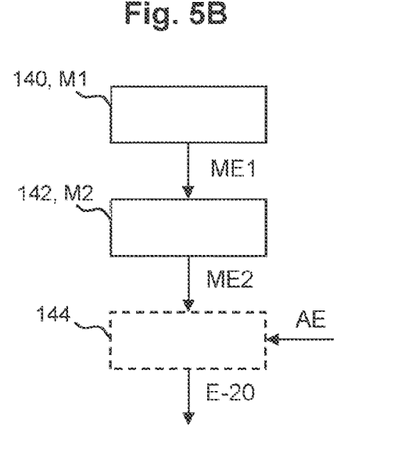

In further exemplary embodiments, c.f. FIG. 5B, it is provided that the method further includes: carrying out 142 at least one second measurement M2 relating to the object 20 by means of at least one further measuring method, which is not caused by the terahertz radiation TS, wherein a second measuring result ME2 is obtained, and, optionally, ascertaining 144 the at least one property E-20 of the object based on the first measuring result ME1 and on the second measuring result ME2 and based on at least one part of the analysis result AE.

Figure 6:
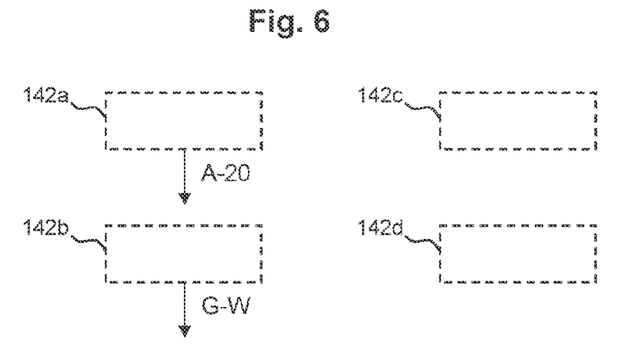

In further exemplary embodiments, c.f. FIG. 6, it is provided that the second measurement M2 includes at least one of the following elements: a) ascertaining 142a a spacing A-20 between the object 20 (e.g. a surface of the object 20) and at least one component of the terahertz device 10, e.g. a THz transmitter and/or THz receiver of the terahertz device 10, b) ascertaining 142b at least one parameter G-W that characterises an angle between a beam path of the terahertz device 10 and a surface normal of a or the surface of the object 20, c) ascertaining 142c surface properties and/or shape properties, for example a curvature (in at least one dimension), of a or the surface of the object 20, d) ascertaining 142d at least one further property of the object 20, for example a temperature and/or an aggregate state and/or an e.g. electric conductivity.

In further exemplary embodiments, at least some of the embodiments mentioned above by way of example for the second measurement can be carried out without contact or contacting the object 20 at least intermittently.

Figure 7:
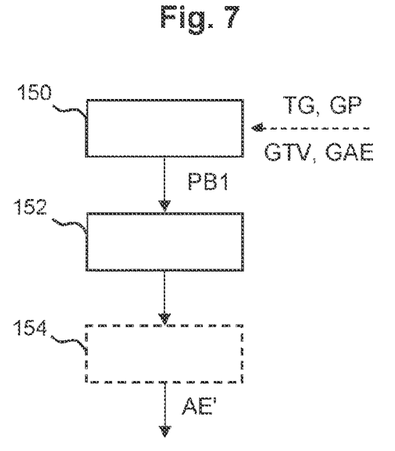

In further exemplary embodiments, FIG. 7, it is provided that the method further includes: predetermining 150 at least one parameter range PB1, which characterises a value range of at least one parameter of the model MOD, e.g. relating to at least one property E-20 of the object 20, analysing 152 the model MOD for the at least one parameter range PB1, and, optionally, at least temporarily saving 154 an analysis result AE' ascertained based on the analysis 152 of the model MOD for the at least one parameter range PB1.

In further exemplary embodiments, a parameter range of interest e.g. for measurements following later can be set by predetermining 150 the at least one parameter range PB1, or the analysis result AE' can be limited to the range of interest.

In further exemplary embodiments, it is provided that the predetermination 150 is carried out based on at least one of the following elements: a) at least one tolerance limit TG relating to the object 20, for example one or more production tolerances of the object 20 and/or production tolerances of components, for example lacquer layers 21, 22, 23, of the object 20, b) parameters GP characterising a process of a measurement relating to the object 20, for example an exactness of a positioning of the terahertz device 10 in relation to the object 20 for a measurement to be carried out by means of THz radiation TS (e.g. a positioning exactness of a positioning system such as e.g. a robot (not shown) which positions and/or aligns the THz device 10 in relation to the object 20), c) parameters GTV characterising the terahertz device, for example parameters characterising the frequency range of the terahertz radiation TS, d) at least one parameter GAE characterising a use of the analysis result AE, AE'.

In further exemplary embodiments, the method, for example the predetermination 150, includes: using filters, e.g. adaptive filters, carrying out a sensitivity analysis. Thus, in further preferred embodiments, such parts of the data that can be used for the model MOD can preferably be used, which includes comparatively a lot of information about the object 20 or the surroundings U or the THz device 10.

Figure 8:
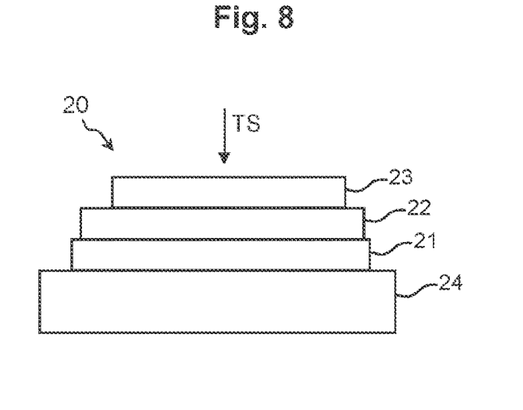

In further exemplary embodiments, FIG. 8, it is provided that the object 20 has a layer construction made of one or more layers 21, 22, 23, e.g. lacquer layers, wherein for example at least one layer 21, 22, 23 has a polymer material, wherein the object 20 optionally has at least one layer 24, for example a substrate, made of a metallic material.

In further exemplary embodiments, the object 20 can also be formed in such a way that the THz radiation TS is transmitted at least regionally, i.e. is radiated at least partially through the object 20.

Figure 9A:
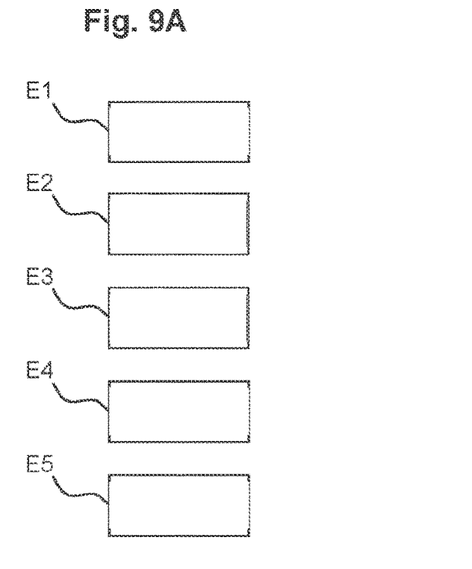

In further exemplary embodiments, FIG. 9A, it is provided that the model MOD (FIG. 1) characterises properties of the object 20, wherein the properties of the object 20 include at least one of the following elements: a) a parameter E1 characterising a layer thickness of at least one layer, e.g. the layer thickness itself, b) refraction index E2, for example refraction index depending on the frequency, of at least one layer, c) absorption index E3, for example absorption index depending on frequency, of at least one layer, d) aggregate state E4 of at least one layer, e) properties E5 of a substrate.

Figure 9B:
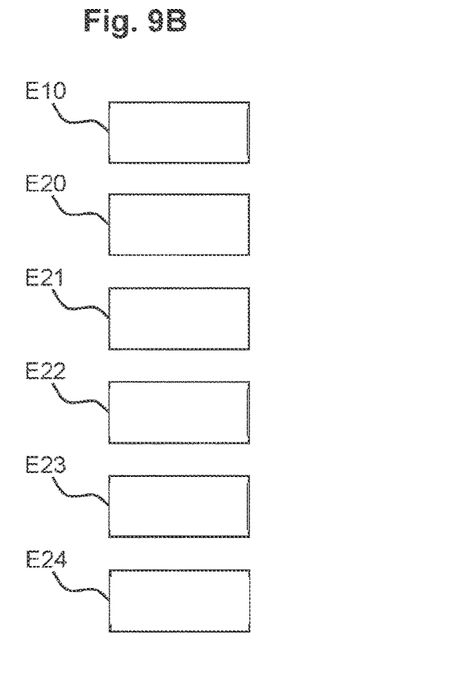

In further exemplary embodiments, FIG. 9B, it is provided that the model MOD characterises properties of the at least one terahertz device 10 (FIG. 1) and/or at least one component of the terahertz device 10, wherein the properties of the terahertz device 10 include at least one of the following elements: a) propagation properties E10 of the terahertz radiation TS, for example in the region of the terahertz device 10 and/or in the region of the object 20, for example characterisable by amplitude and/or phase properties.

In further exemplary embodiments, the propagation properties of the terahertz radiation TS can be characterised, for example, in a spectral range, and/or spatially.

In further exemplary embodiments, it is provided that the model MOD characterises properties of a surroundings U (FIG. 1) of the at least one terahertz device 10 and/or the object 20, wherein the properties of the surroundings U of the at least one terahertz device 10 and/or the object 20 include at least one of the following elements: a) refraction index E20, for example refraction index depending on frequency, of at least one medium in the region of the surroundings, b) absorption index E21, for example absorption index depending on frequency, c) aggregate state E22, d) temperature E23, e) pressure E24.

Figure 10:
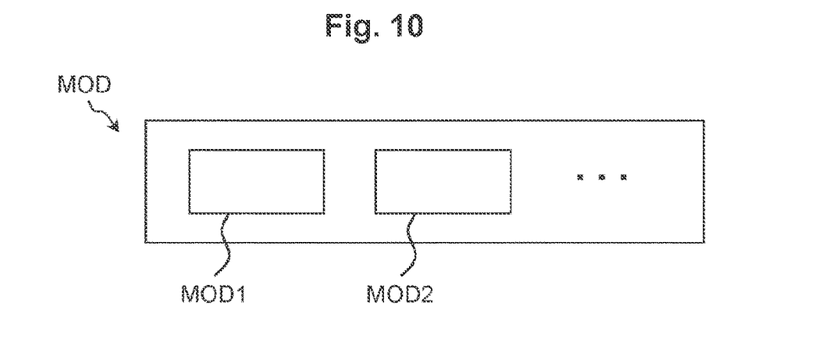

In further exemplary embodiments, FIG. 10, it is provided that the model MOD includes at least one of the following elements: a) a reflection model or transmission model MOD1 which characterises reflections or transmissions TS in the object 20, for example, b) a propagation model MOD2 which characterises the propagation of the THz radiation TS, for example through the THz device 10 and/or the surroundings U.

Figure 11A:
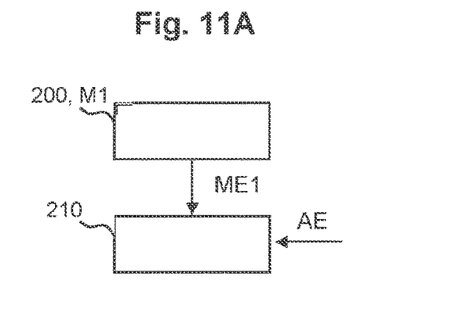

Further exemplary embodiments, FIG. 11A, relate to a method for processing at least one measuring result relating to an object 20 (FIG. 1), wherein the method includes: carrying out 200 at least one first measuring M1 relating to the object 20 by means of terahertz radiation TS, wherein a first measuring result ME1 is obtained (for example analogously to step 140 according to FIG. 5A), ascertaining 210 at least one property of the object 20 based on the first measuring result ME1 and on at least one analysis result AE or at least one part of an analysis result AE, which is obtained when analysing 110 (FIG. 1) a model MOD, wherein the model MOD characterises a propagation of the THz radiation TS, for example in the region of at least one terahertz device 10 and/or the object 20.

In further exemplary embodiments, it is provided that the analysis result AE has been ascertained according to the embodiments described above by way of example, c.f. FIGS. 1 to 10.

Figure 11B:
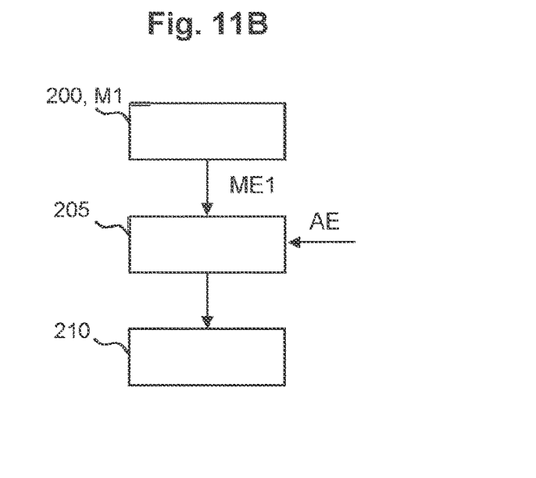

In further exemplary embodiments, FIG. 11B, it is provided that the method further includes: receiving 205 the analysis result AE, e.g. from a device which has ascertained the analysis result, e.g. according to the embodiments described above by way of example, and/or which saves the analysis result at least intermittently. Optionally, the step 200 can be carried out before step 205 (or, in further exemplary embodiments, also after it or at least partially temporally overlapping).

In further exemplary embodiments, it is provided that the analysis result AE is ascertained or has been ascertained before carrying out 200 the first measurement M1.

Figure 11C:
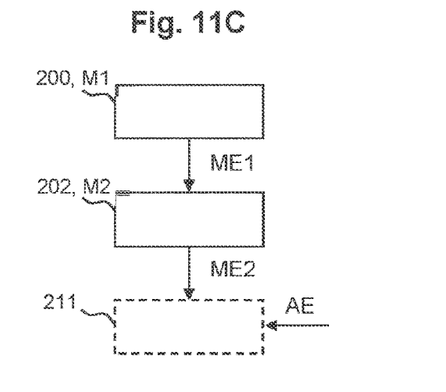

In further exemplary embodiments, FIG. 11C, it is provided that the method further includes: carrying out 202 at least one second measuring M2 relating to the object 20 by means of at least one further measuring method, which is not caused by the terahertz radiation TS, for example, wherein a second measuring result ME2 is obtained, and, optionally, ascertaining 211 the at least one property of the object 20 based on the first measuring result ME1 and on the second measuring result ME2 and based on at least one part of the analysis result AE.

Figure 12:
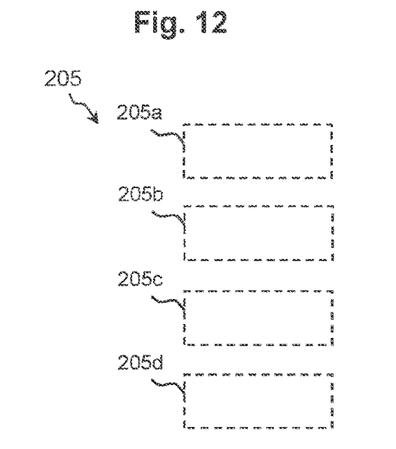

In further exemplary embodiments, FIG. 12, it is provided that receiving 205 (FIG. 11B) the analysis result AE includes at least one of the following elements: a) receiving 205a data DAT-AE (FIG. 4) characterising the analysis result AE via a local, for example wire-bound and/or wireless, data interface DS1, DS1', b) receiving 205b (FIG. 12) data DAT-AE characterising the analysis result via a data network DN, for example an at least regionally public data network (e.g. internet) or private data network (or e.g. also VPN), wherein the data network DN has, for example, at least one wire-bound data connection DV1 and/or wireless data connection DV2, c) retrieving 205c data DAT-AE characterising the analysis result AE from a cloud system CS and/or edge-computing system (not shown), d) loading 205d data characterising the analysis result by at least one data medium DT (FIG. 4).

In further exemplary embodiments, it is provided that the method described above by way of example is a computer-implemented method. In further exemplary embodiments, this applies both to the method described above by way of example according to claims 1 to 14 and to the method described above.

Further exemplary embodiments, FIG. 13, relate to a device 300 for carrying out the method according to the embodiments.

The device 300 (FIG. 13) has a computing device 302 ("computer") and a storage device 304 allocated to the computing device 302. In further exemplary embodiments, the storage device 304 has a volatile memory 304a, for example internal memory 304a ("RAM"), and/or a non-volatile memory 304b.

In further exemplary embodiments, the device 300 is formed to store at least temporary data DAT3, e.g. in the RAM 304*a*, which can be used for carrying out the method according to the embodiments, e.g. data DAT of the model MOD or parameters, input data, configuration data etc.

In further exemplary embodiments, the device 300 is formed to store temporary data (e.g. the at least one analysis result AE or parts of the database DB) and/or programs PRG3, e.g. in the non-volatile memory 304*b*, which can be used for carrying out the method according to the embodiments.

Further exemplary embodiments relate to a computer-readable storage medium SM3, comprising commands PRG3', which, when carried out by a computer 302, allow it to carry out the method according to the embodiments (e.g. according to claims 1 to 14).

Further exemplary embodiments relate to a computer program PRG3, PRG3', comprising commands which, when a computer 302 carries out the program PRG3, PRG3', allow it to carry out the method according to the embodiments (e.g. according to claims 1 to 14).

Further exemplary embodiments relate to a data medium signal DCS3 which transfers and/or characterises the computer program PRG3, PRG3' according to the embodiments. The data medium signal DCS3 can be transferred, for example, via an optional data interface 306 of the device 300, as well as, optionally, data for controlling the THz device 10 or data DAT-AE (FIG. 4).

The device 400 (FIG. 14) has a computer 402 and a storage medium 404 allocated to the computer 402. In further exemplary embodiments, the device 400 has a configuration comparable to the device 300 according to FIG. 13, wherein the components 404*a*, 404*b*, 406, SM4, PRG4, PRG4', DCS4 correspond e.g. to the components 304*a*, 304*b*, 306, SM3, PRG3, PRG3', DCS3.

In further exemplary embodiments, the device 400 is formed to at least temporarily store data DAT4, e.g. in the RAM 404*a*, which can be used for carrying out the method according to the embodiments (e.g. FIG. 11Aff.), e.g. measuring results ME1, ME2, analysis result(s) AE.

In further exemplary embodiments, the device 400 is formed to at least temporarily store programs PRG4, PRG4', e.g. in the non-volatile memory 304*b*, which can be used for carrying out the method according to the embodiments.

Further exemplary embodiments relate to a computer-readable storage medium SM4, comprising commands PRG4', which, when carried out by a computer 402, allow it to carry out the method according to the embodiments.

Further exemplary embodiments relate to a computer program PRG4, PRG4', comprising commands which, when carried out by a computer 402, allow it to carry out the method according to the embodiments.

Further exemplary embodiments relate to a data medium signal DCS4 which transfers and/or characterises the computer program PRG4, PRG4' according to the embodiments. The data medium signal DCS4 can be transferred, for example, via an optional data interface 406 of the device 400, as well as, optionally, data for controlling the THz device 10 or data DAT-AE (FIG. 4).

Figure 15:
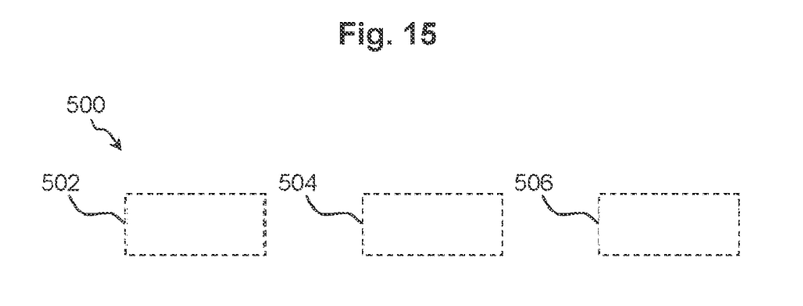

Further exemplary embodiments, FIG. 15, relate to a use 500 of the method according to the embodiments and/or the device according to the embodiments and/or the computer-readable storage medium according to the embodiments and/or the computer program according to the embodiments and/or the data medium signal according to the embodiments for at least one of the following elements: a) ascertaining 502 properties of the object 20, b) predicting 504 the analysis result AE, for example before carrying out a or the first measuring M1 and/or second measuring M2, c) training 506 a for example artificial neuronal network, for example of a deep artificial neuronal network.

Figure 16:
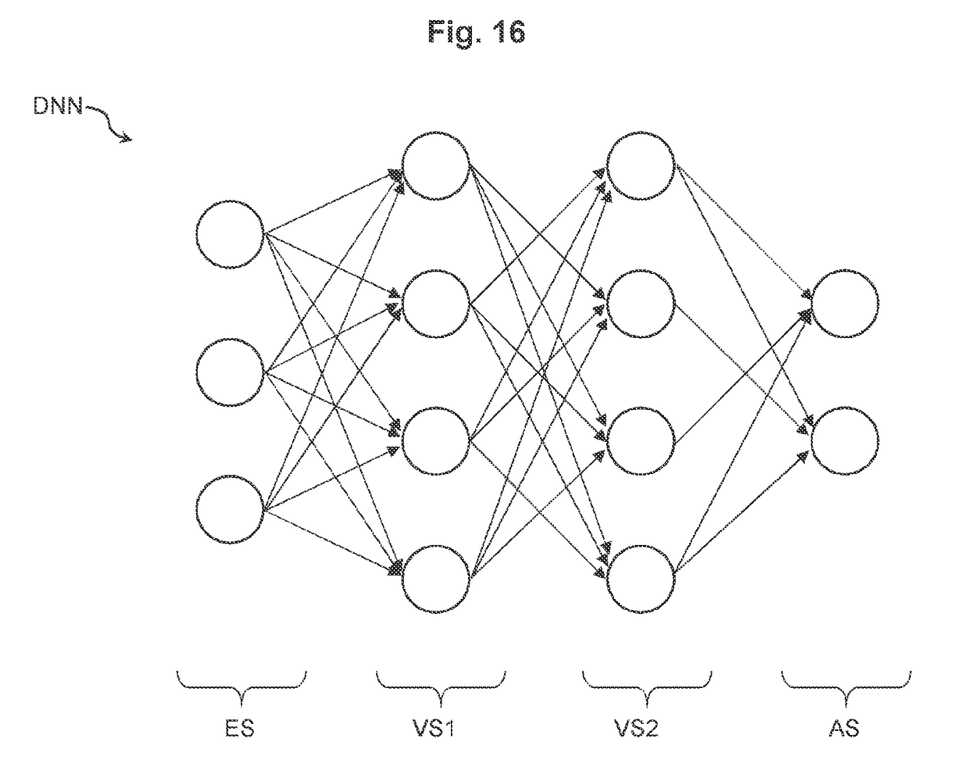

FIG. 16 schematically shows a deep artificial neuronal network DNN according to exemplary embodiments. It has an input layer ES with a first number of processing elements (artificial neurones) not labelled individually, an output layer AS with a second number of artificial neurones, and at least one layer VS1, VS2 arranged between the input layer ES and the output layer AS (presently e.g. two layers VS1, VS2), which are also referred to as hidden layers VS1, VS2.

The processing can, in each case, be connected among themselves, e.g. in each case to one or more other processing elements of a previous layer ES and/or a following VS2 and/or their "own" layer VS1 and can receive values from the other processing elements or can send values to other processing elements. In further exemplary embodiments, at least some processing elements can process received values according to predeterminable processing rules (e.g. calculating rules and/or weights for the individual values associated with different connections), wherein e.g. activation functions can be used e.g. of the type Sigmoid or ReIU etc.

In further exemplary embodiments, the artificial neuronal network DNN can be trained e.g. on the basis of at least one of the following elements: a) first measuring result ME1, b) second measuring result ME2, c) model MOD, d) analysis result AE.

In further exemplary embodiments, training the artificial neuronal network DNN can include producing and/or changing at least one connection between artificial neurones and/or changing weight(s) allocated to at least one connection and/or selecting and/or changing at least one activation function allocated to an artificial neurone.

In further exemplary embodiments, the artificial neuronal network DNN can be formed and/or trained to receive at least the first measuring result ME1 and, optionally, information of the model MOD as input data, e.g. by means of the input layer ES, and to ascertain e.g. a layer thickness of at least one layer of the object 20 based on this input data, and to emit e.g. by means of the output layer AS.

For example, in further exemplary embodiments, an artificial neuron of the output layer AS can be allocated to at least one layer 21 (FIG. 8) of the object 20, which emits a layer thickness of the layer 21 e.g. based on the input data mentioned above as the output value.

The invention claimed is:

1. Method for processing data associated with a model, wherein the model characterises a propagation of terahertz radiation (TS) in the region of at least one terahertz device and at least one object that can be examined by means of the terahertz radiation wherein the model characterizes properties of the object, wherein the properties of the object include at least one of the following elements: a) a parameter characterizing a layer thickness of at least one layer, b) refraction index of at least one layer, c) absorption index, d) aggregate state of at least one layer, e) properties of a substrate, wherein the model characterizes properties of the at least one terahertz device and/or at least one component of the terahertz device, wherein the properties of the terahertz device include at least one of the following elements: a) propagation properties of the terahertz radiation in the region of the terahertz device and/or in the region of the object characterizable by amplitude and/or phase properties, wherein predetermining at least one parameter range, which characterises a value range of at least one parameter relating to at least one property of the object, analysing the model for the at least one parameter range, and at least temporarily saving an analysis result ascertained based on the analysis of the model for the at least one parameter range, wherein the analysis result is ascertained or has been ascertained before carrying out the first measuring with respect to the object by means of the terahertz radiation, wherein the method further includes:

carrying out at least one first measurement in relation to the object by means of the terahertz radiation, wherein a first measuring result is obtained, ascertaining at least one property of the object based on the first measuring result and on at least one part of the analysis result, and carrying out at least one second measurement relating to the object by means of at least one further measuring method, which is not caused by the terahertz radiation, wherein the second measurement includes at least one of the following elements: a) ascertaining a spacing between the object and at least one component of the terahertz device, b) ascertaining at least one parameter that characterises an angle between a beam path of the terahertz device and a surface normal of a surface of the object, c) ascertaining surface properties and/or shape properties, of a or the surface of the object, wherein a second measuring result is obtained, and ascertaining the at least one property of the object based on the first measuring result and on the second measuring result and based on at least one part of the analysis result.

2. Method according to claim 1, further including: providing at least one part of the analysis result wherein providing includes at least one of the following elements: a) sending data characterising the analysis result via a local, wire-bound and/or wireless, data interface, b) sending data characterising the analysis result via a data network, wherein the data network has at least one wire-bound data connection and/or wireless data connection, c) providing data characterising the analysis result via a cloud system, d) providing data characterising the analysis result by means of at least one data medium.

3. Method according to claim 1, wherein the second measuring further includes d) ascertaining at least one further property of the object.

4. Method according to claim 3, wherein ascertaining a temperature and/or an aggregate state and/or an electric conductivity is the at least one further property of the object.

5. Method according to claim 1, wherein the predetermining is carried out based on at least one of the following elements: a) tolerance limits relating to the object, b) parameter(s) characterising a process of a measurement relating to the object, c) parameter(s) characterising the terahertz device, d) at least one parameter characterising a use of the analysis result.

6. Method according to claim 1, wherein the object has a layer construction made of one or more layers and the object has at least one layer made of a metallic material or a non-metallic material.

7. Method according to claim 1, wherein the object has a layer construction made of more layers, wherein at least one layer has a polymer material, wherein the object has at least one layer made of a non-metallic material or metallic material.

8. Method according to claim 1, wherein the model characterises properties of a surroundings of the at least one terahertz device and/or the object, wherein the properties of the surroundings of the at least one terahertz device and/or the object include at least one of the following elements: a) refraction index of at least one medium in the region of the surroundings, b) absorption index, c) aggregate state, d) temperature, e) pressure.

9. Method according to claim 1, wherein the model includes at least one of the following elements: a) a reflection model or transmission model which characterises reflections or transmissions of the THz radiation in the object, b) a propagation model which characterises the propagation of the THz radiation through the THz device and/or the surroundings.

10. Method according to claim 1, wherein the THz radiation has a frequency range of between 0.1 THz and 30 THz or between 3 THz and 10 THz or between 4.5 THz and 6.5 THz.

11. Device for carrying out the method according to claim 1.

12. Method according to claim 1 which includes a) ascertaining properties of the object, b) predicting the analysis result before carrying out a or the first and/or second measuring, c) training an artificial, neuronal network.

13. Method for processing at least one measuring result relating to an object, wherein the method includes: carrying out at least one first measuring relating to the object by means of terahertz radiation, wherein a first measuring result is obtained, ascertaining at least one property of the object based on the first measuring result and on at least one analysis result or at least one part of an analysis result, which is obtained when analysing a model, wherein the method further includes: carrying out at least one second measuring relating to the object by means of at least one further measuring method, which is not caused by the terahertz radiation wherein the second measuring includes at least one of the following elements: a) ascertaining a spacing between the object and at least one component of the terahertz device, b) ascertaining at least one parameter that characterises an angle between a beam path of the terahertz device and a surface normal of a surface of the object, c) ascertaining surface properties and/or shape properties, of a or the surface of the object, wherein a second measuring result is obtained, and ascertaining the at least one property of the object based on the first measuring result and on the second measuring result and based on at least one part of the analysis result, which is obtained when analyzing the model, wherein the model specifies a characteristic of a propagation of the THz radiation in the region of at least one terahertz device and/or the object, predetermining at least one parameter range, which characterises a value range of at least one parameter relating to at least one property of the object, analysing the model for the at least one parameter range, and at least temporarily saving an analysis result ascertained based on the analysis of the model for the at least one parameter range, wherein the analysis result is ascertained or has been ascertained before carrying out the first measuring.

14. Method according to claim 13, further including: receiving the analysis result.

15. Method according to claim 13, wherein receiving the analysis result includes at least one of the following elements: a) receiving data characterising the analysis result via a local wire-bound and/or wireless, data interface, b) receiving data characterising the analysis result via a data network, wherein the data network has at least one wire-bound connection and/or wireless data connection, c) retrieving data characterising the analysis result from a cloud system, d) loading data characterising the analysis result by at least one data medium.

16. Method according to claim 13, wherein the THz radiation has a frequency range of between 0.1 THz and 30 THz, or between 3 THz and 10 THz, or between 4.5 THz and 6.5 THz.

17. Device for carrying out the method according to claim 13.

18. Method according to claim 13 which includes a) ascertaining properties of the object, b) predicting the analysis result, before carrying out a or the first and/or second measuring, c) training an artificial, neuronal network.

* * * * *